No. 857,314. PATENTED JUNE 18, 1907.
W. T. STANFIELD.
BELT SHIFTING MECHANISM.
APPLICATION FILED JAN. 29, 1906.
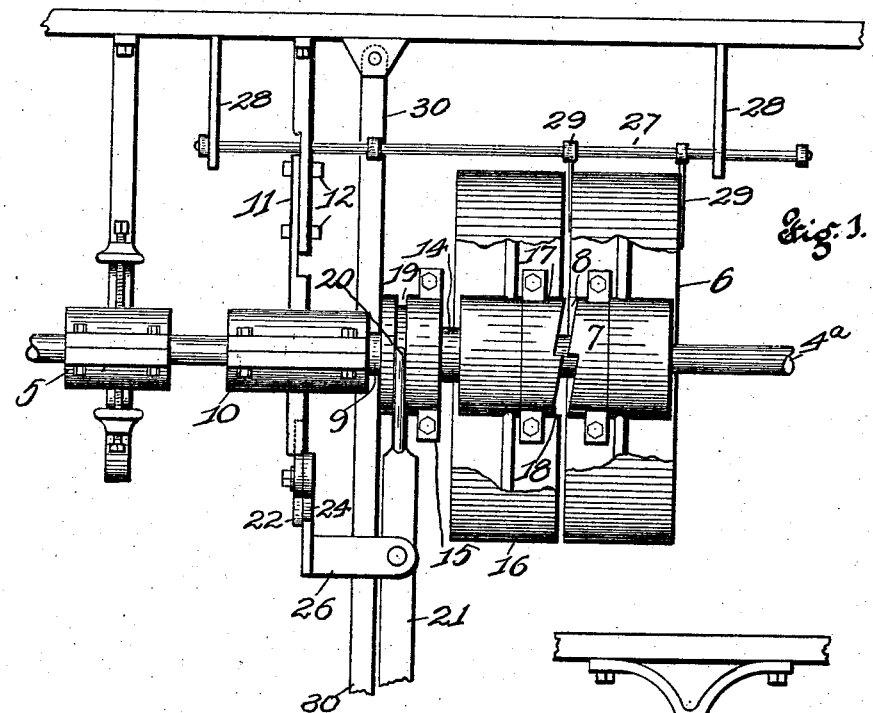
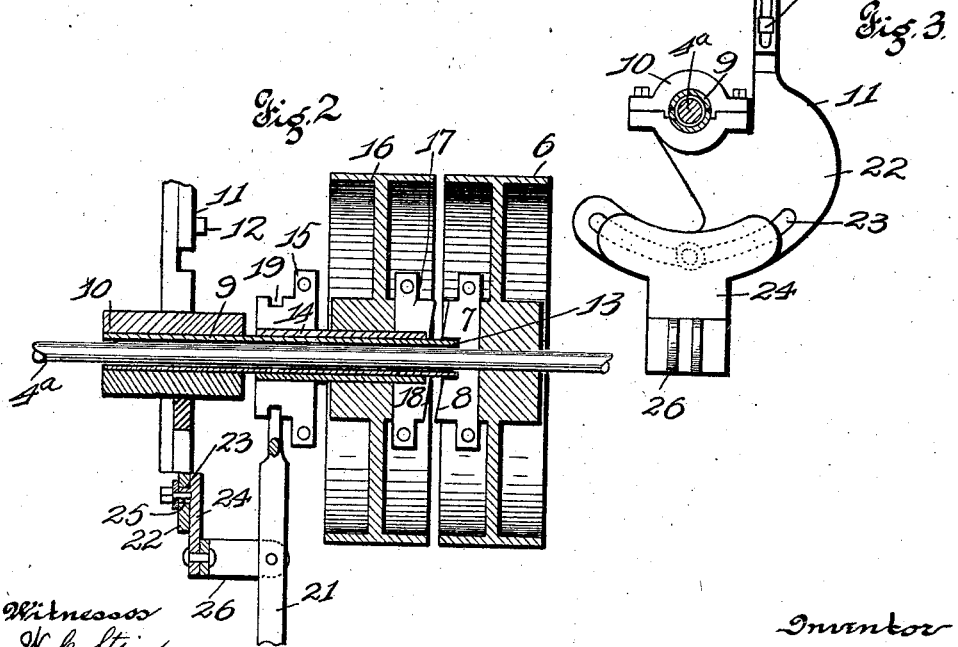
Witnesses
W. C. Stein.
L. A. L. McIntyre
Inventor
William T. Stanfield
by Hopkins & Ticks attys.

UNITED STATES PATENT OFFICE.

WILLIAM T. STANFIELD, OF ST. LOUIS, MISSOURI, ASSIGNOR OF ONE-HALF TO EDWIN ETTINGER, OF ST. LOUIS, MISSOURI.

BELT-SHIFTING MECHANISM.

No. 857,314.     Specification of Letters Patent.     Patented June 18, 1907.

Application filed January 29, 1906. Serial No. 298,502.

*To all whom it may concern:*

Be it known that I, WILLIAM T. STANFIELD, a citizen of the United States, and a resident of St. Louis, Missouri, have invented certain new and useful Improvements in Belt-Shifting Mechanisms, of which the following is a specification.

This invention relates to improvements in a belt shifting mechanism, and consists in the novel arrangement, construction and combination of parts as will be fully hereinafter described and claimed.

The object of my invention is to provide a mechanism whereby the belt which operates a counter-shaft from the line-shaft may be shifted on to a set of pulleys and placed out of operation without interfering with the operation of the main shaft.

A further object of my invention is to cause the belt running from a counter-shaft to a line-shaft to come to rest when removed from the driving wheel on the main shaft to save the wear and tear of the same together with the machinery.

In the drawings—Figure 1 is a side elevation of my improved mechanism showing a portion of the pulleys broken away for viewing the internal mechanism. Fig. 2 is a vertical sectional view of the same. Fig. 3 is a detail side view of the hanger made use of in connection with my invention.

Referring to the drawings in detail, $4^a$ indicates a main shaft which is suitably held in suspended position in journals 5 which are of ordinary construction. Upon the shaft $4^a$, I mount in the usual manner a driving pulley 6, and to the hub of the same I secure one member 7 of the clutch, the face of which being provided with the clutch teeth 8. The pulley 6, together with the clutch member 7 is continually in operation with the shaft $4^a$. Around the shaft $4^a$ I place an elongated sleeve 9 which is made in two halves, and the one end of said halves is retained in rigid position within the clamp jaws 10, of the hanger 11. The clamp jaws 10 are also constructed in halves. The hanger 11 is arranged to be adjusted by the screws 12 to bring the sleeve in proper alinement with the shaft $4^a$, when attaching the same thereon. The sleeve 9 when being placed in position is so arranged that the shaft $4^a$ may revolve freely therein without touching any portion thereof, and the free end 13 of the sleeve 9 is recessed in the clutch member 7. Upon this sleeve 9 I provide a second sleeve 14 also constructed in halves and retained in position by a clamp 15. Upon the sleeve 14 is rigidly attached the pulley 16 to the hub of which is attached the clutch member 17, its face provided with clutch teeth 18 to mesh with the teeth 8 of the clutch member 7.

The clamp 15 is constructed tubular in form, and provided with a groove 19 in which is inserted prongs 20 of the bifurcated shifting lever 21.

The hanger 11 is provided with a segment portion 22 in which is provided a curvilinear slot 23 in which may be adjusted the shifting lever bracket 24. On the one face of the bracket 24 I provide a projecting lug 25 which projects through the curvilinear slot 23, and to said lug is attached a washer and screw for retaining the bracket in its adjusted position. The shifting lever 21 is pivotally connected to the ears 26 of the bracket 24 whereby the clamp 15, sleeve 14, and pulley 16, together with its clutch section may be shifted on the sleeve 9 to bring the cam members in or out of contact. In connection with this mechanism I provide an ordinary belt shifting device consisting of a horizontal bar 27 slidably mounted in hangers 28, and on the bar is located a pair of prongs 29, one of each to be located on each side of the belt, and this bar 27 together with its prongs are slidably operated by means of the lever 30.

The operation of my invention is as follows: The belt is placed upon the pulley 6 and extended across to another pulley (not shown). While upon these pulleys a counter-shaft is placed in operation together with the machinery connected therewith. When it is desired to remove the belt from the pulley 6, or in fact, place the machinery out of operation, the attendant, by means of the lever 21, shifts the pulley 16, together with its clutch member against the pulley 6, thereby bringing the teeth of both clutch members in contact. At this period the pulley 16 is revolved with the pulley 6; the attendant then, by means of his other hand, shifts the lever 30, removing the belt from the pulley 6 on the pulley 16, then the attendant operates the lever 21 in opposite direction releasing the pulley 16, together with its clutch member, from the pulley 6, and its clutch member, thereby stopping the operation of the belt leading from the main shaft to the counter-shaft. The pulleys on the counter-shaft are arranged one tight and the other loose. By this operation, the belt leading from the main shaft to the counter-shaft is never removed from the pulleys in order to stop the operation of said belt. The same can be easily placed in and out of operation by the shifting mechanism as described. By the use of the sleeves as described, the pulley 16, when released from the pulley 6 is absolutely stationary, and has no contact whatsoever with the revolving shaft 4ª.

Having fully described my invention, what I claim is:

A belt shifting mechanism comprising an adjustable hanger, a sleeve composed of two sections supported in said hanger, a bracket adjustably located upon said hanger, a shifting lever supported in said bracket, a sleeve supported on the first-mentioned sleeve, a clamp, said clamp holding together the last-mentioned sleeve also constructed of two sections, a pulley rigidly mounted upon the last mentioned sleeve in combination with a line-shaft loosely operating in the sleeve held in the adjustable hanger, a pulley rigidly mounted upon the line-shaft, clutch members connected to each pulley and each being composed of two sections, the clutch members supported to the pulley-wheel on the line-shaft provided with a depression in which the end of the sleeve supported by the hanger is recessed, substantially as specified.

In testimony whereof, I have signed my name to this specification, in presence of two subscribing witnesses.

WILLIAM T. STANFIELD.

Witnesses:
 ALFRED A. EICKS,
 WALTER C. STEIN.